US010766489B2

(12) United States Patent
Tuncali et al.

(10) Patent No.: US 10,766,489 B2
(45) Date of Patent: Sep. 8, 2020

(54) MODEL PREDICTIVE ADAPTIVE CRUISE CONTROL FOR REDUCING REAR-END COLLISION RISK WITH FOLLOWER VEHICLES

(71) Applicants: Cumhur Erkan Tuncali, Tempe, AZ (US); Theodore Pavlic, Tempe, AZ (US); Georgios Fainekos, Tempe, AZ (US)

(72) Inventors: Cumhur Erkan Tuncali, Tempe, AZ (US); Theodore Pavlic, Tempe, AZ (US); Georgios Fainekos, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/122,770

(22) Filed: Sep. 5, 2018

(65) Prior Publication Data
US 2019/0071084 A1    Mar. 7, 2019

Related U.S. Application Data

(60) Provisional application No. 62/554,283, filed on Sep. 5, 2017.

(51) Int. Cl.
*B60W 30/16* (2020.01)
*B60W 30/09* (2012.01)
*B60W 50/00* (2006.01)

(52) U.S. Cl.
CPC .......... *B60W 30/162* (2013.01); *B60W 30/09* (2013.01); *B60W 2050/0031* (2013.01); *B60W 2554/801* (2020.02); *B60W 2554/804* (2020.02)

(58) Field of Classification Search
None
See application file for complete search history.

(56) References Cited

U.S. PATENT DOCUMENTS 9,272,711 B1 *   3/2016  Sivaraman .......... G08G 1/166
2017/0369055 A1 * 12/2017  Saigusa ............ G08G 1/0116

OTHER PUBLICATIONS

Boer E. R., et al, "Driver performance assessment with a car following model," in Proceeding of the third international driving symposium on human factors in driver assessment, training and vehicle design, 2005, pp. 433-440.

(Continued)

*Primary Examiner* — Tamara L Weber
(74) *Attorney, Agent, or Firm* — Quarles & Brady LLP

(57) ABSTRACT

Methods of and systems for adaptive cruise control (ACC) of a vehicle include a controller for the vehicle that is configured to execute a computer-implemented model predictive control and a safe spacing policy that reduces collision risk between the vehicle and both a leading vehicle and a following vehicle. The methods include sensing a speed of a leader vehicle in front of the ego vehicle and a distance of the leader vehicle from the ego vehicle, sensing a speed of a follower vehicle behind the ego vehicle and a distance of the follower vehicle from the ego vehicle, and controlling the speed of the ego vehicle to avoid collision with the leader vehicle while reducing risk of the ego vehicle being hit by the follower vehicle.

20 Claims, 5 Drawing Sheets

(56) References Cited

OTHER PUBLICATIONS

Cagienard R., et al, "Move blocking strategies in receding horizon control," Journal of Process Control, vol. 17, No. 6, pp. 563-570, 2007.

Evans L. et al, "Antilock brakes and risk of front and rear impact in two-vehicle crashes," Accident Analysis & Prevention, vol. 28, No. 3, pp. 315-323, 1996.

Gerdes J. C., et al, "Vehicle speed and spacing control via coordinated throttle and brake actuation," Control Engineering Practice, vol. 5, No. 11, pp. 1607-1614, 1997.

Hayward J. C., "Near miss determination through use of a scale of danger," 1972.

Ioannou P. et al, "Throttle and brake control systems for automatic vehicle following," Journal of Intelligent Transportation Systems, vol. 1, No. 4, pp. 345-377, 1994.

Kamal M. A. S., et al, "Smart driving of a vehicle using model predictive control for improving traffic flow," IEEE Transactions on Intelligent Transportation Systems, vol. 15, No. 2, pp. 878-888, 2014.

Li S. E., et al, "Fast online computation of a model predictive controller and its application to fuel economy-oriented adaptive cruise control," IEEE Transactions on Intelligent Transportation Systems, vol. 16, No. 3, pp. 1199-1209, 2015.

Li S., et al, "Model predictive multiobjective vehicular adaptive cruise control," IEEE Transactions on Control Systems Technology, vol. 19, No. 3, pp. 556-566, 2011.

Li Z., et al, "Surrogate safety measure for evaluating rear-end collision risk related to kinematic waves near freeway recurrent bottlenecks," Accident Analysis & Prevention, vol. 64, pp. 52-61, 2014.

Loos S. M., et al, "Adaptive cruise control: Hybrid, distributed, and now formally verified," in International Symposium on Formal Methods. Springer, 2011, pp. 42-56.

Luo L.-h., et al, "Model predictive control for adaptive cruise control with multi-objectives: comfort, fuel-economy, safety and car-following," Journal of Zhejiang University-Science A, vol. 11, No. 3, pp. 191-201, 2010.

MATLAB, version 9.2.0 (R2017a). Natick, Massachusetts: The MathWorks Inc., 2017.

Minderhoud M. M. et al, "Extended time-to-collision measures for road traffic safety assessment," Accident Analysis & Prevention, vol. 33, No. 1, pp. 89-97, 2001.

Moon S., et al, "Design, tuning, and evaluation of a full-range adaptive cruise control system with collision avoidance," Control Engineering Practice, vol. 17, No. 4, pp. 442-455, 2009.

Naranjo J. E., et al, "Acc+ stop&go maneuvers with throttle and brake fuzzy control," IEEE Transactions on Intelligent transportation systems, vol. 7, No. 2, pp. 213-225, 2006.

Newell G. F., "A simplified car-following theory: a lower order model," Transportation Research Part B: Methodological, vol. 36, No. 3, pp. 195-205, 2002.

Ozbay K., et al, "Derivation and validation of new simulation-based surrogate safety measure," Transportation Research Record: Journal of the Transportation Research Board, No. 2083, pp. 105-113, 2008.

Sancar, Feyyaz Emre, et al. "MPC based collaborative adaptive cruise control with rear end collision avoidance." 2014 IEEE Intelligent Vehicles Symposium Proceedings. IEEE, 2014.

Stanger T. et al, "A model predictive cooperative adaptive cruise control approach," in American Control Conference (ACC), 2013. IEEE, 2013, pp. 1374-1379.

Svensson, A. et al. "Estimating the severity of safety related behaviour." Accident Analysis & Prevention 38.2 (2006):379-385.

Tak S., et al, "Development of a deceleration-based surrogate safety measure for rear-end collision risk," IEEE transactions on intelligent transportation systems, vol. 16, No. 5, pp. 2435-2445, 2015.

Tarko, A. et al, "Surrogate measures of safety," White paper, ANB20 (3) Subcommittee on Surrogate Measures of Safety, 2009.

Touran A., et al, "A collision model for safety evaluation of autonomous intelligent cruise control," Accident Analysis & Prevention, vol. 31, No. 5, pp. 567-578, 1999.

Treiber M., et al, "Congested traffic states in empirical observations and microscopic simulations," Physical review E, vol. 62, No. 2, p. 1805, 2000.

Vahidi A. et al, "Research advances in intelligent collision avoidance and adaptive cruise control," IEEE transactions on intelligent transportation systems, vol. 4, No. 3, pp. 143-153, 2003.

Wang J., et al, "An adaptive longitudinal driving assistance system based on driver characteristics," IEEE Transactions on Intelligent Transportation Systems, vol. 14, No. 1, pp. 1-12, 2013.

Zhang J. et al, "Longitudinal control of heavy trucks in mixed traffic: environmental and fuel economy considerations," IEEE Transactions on Intelligent Transportation Systems, vol. 7, No. 1, pp. 92-104, 2006.

Zhao, D. et al, "Fullrange adaptive cruise control based on supervised adaptive dynamic programming," Neurocomputing, vol. 125, pp. 57-67, 2014.

Zhao, D. et al, "Model-free optimal control for affine nonlinear systems with convergence analysis," IEEE Transactions on Automation Science and Engineering, vol. 12, No. 4, pp. 1461-1468, 2015.

\* cited by examiner

MODEL PREDICTIVE ADAPTIVE CRUISE CONTROL FOR REDUCING REAR-END COLLISION RISK WITH FOLLOWER VEHICLES

CROSS-REFERENCE TO RELATED APPLICATIONS

This application is a non-provisional and claims the benefit of U.S. Prov. Pat. App. Ser. No. 62/554,283, filed under the same title on Sep. 5, 2017, and incorporated fully herein by reference.

STATEMENT REGARDING FEDERALLY SPONSORED RESEARCH OR DEVELOPMENT

This invention was made with government support under Grant No. CNS 1446730 awarded by the National Science Foundation. The government has certain rights in the invention.

BACKGROUND

Adaptive cruise controllers are one of the main components of intelligent driving systems. Whereas traditional cruise control systems can regulate the speed of a vehicle at a desired level, an Adaptive Cruise Control (ACC) system is also capable of ensuring a safe following distance to (i.e., to avoid a collision with) a preceding vehicle by slowing down when necessary. Partial ACC systems are operative only in certain speed ranges and require driver intervention when the vehicle speed is outside the predefined range. Full-range ACC systems are able to control the vehicle at the full speed-range of the vehicle and can even bring the vehicle to a full stop when there is an immediate collision risk with a preceding vehicle.

Because ACC has the most control over the distance to the preceding vehicle, the focus in the art has been on front-end collisions. Early work on automatic vehicle following has focused on the technical challenge of combining throttle and brake controllers for a unified action. Fixed-gain, gain-scheduled, and adaptive PID throttle controllers as well as linear feed-back brake control and a switching logic between throttle and brake controllers have all been proposed. Similar switching logic based on sliding mode control has also been proposed for switching between throttle and braking controllers. Although these approaches show the feasibility of building controllers capable of switching between throttle and braking as needed, passenger comfort, safety, and fuel economy are not the main focus shaping the control.

In order to increase passenger comfort and better approximate real human driving characteristics, fuzzy-logic approaches have also been proposed for systems with stop-and-go capabilities, resulting in smooth transitions between throttle and brake controllers in real-world experiments with an automatically driven vehicle following a manual-driven vehicle. In order to couple comfort during normal operation but safety in rare but extreme scenarios, a linear quadratic regulator (LQR) based full-range adaptive cruise control with collision avoidance capabilities has been proposed that divides driving into "comfort," "large deceleration" and "severe braking" modes. The LQR controllers tuned differently for each mode, and special logic is used to switch from one mode to another—effectively reducing the priority on comfort as the situation requires.

One approach to develop ACC systems with collision avoidance is to utilize vehicle-to-vehicle (V2V) and vehicle-to-infrastructure (V2I) communication. Variation in vehicle characteristics is possible so long as conservative bounds on vehicle acceleration and deceleration for over all vehicles are available. In another approach, linear MPC incorporating V2V and V2I communication with the target of minimizing fuel consumption uses piecewise quadratic approximation of a nonlinear static fuel consumption map of a diesel engine in order to reduce the nonlinear problem into a linear MPC problem. So far, these distributed approaches either require strong assumptions on vehicle diversity (a distributed ACC system has been shown to be verifiably safe only under the assumption that all vehicles are driven on the highway with homogeneous controllers) or require linear approximations of fundamentally nonlinear phenomena in order to make the analysis analytically tractable.

The complexity of these and other existing ACC systems belie the fact that determining the appropriate safe following distance in an ACC system is non-trivial. While studies have shown that a system of vehicles with ACC could, in principle, completely eliminate collisions, their methodologies assume either homogeneous vehicles or bounding approximations of vehicles that are so conservative that the large safe following distances betray the promise of high-capacity intelligent transportation systems. Safe and effective ACC and collision-avoidance systems require choices of following distance that are sensitive to human factors and chosen appropriately for different drivers. Moreover, human drivers are responsive to the current state and driver behavior of both the preceding vehicle as well as any following vehicles (e.g., "tail-gating behavior"). An effective ACC should similarly be sensitive to all surrounding vehicles and be shaped by safety measures that consider risk of a wide range of possible collisions while also maintaining comfort, fuel economy, and adherence to owner preferences.

Various measures for safety assessment of driving situations have been proposed in the literature. These safety assessment measures are useful for both evaluating driving safety of a controller and for design of controllers by incorporating them in the control computations. Time-to-Collision (TTC) is one of the most commonly used metrics and measures the time required for a collision between two vehicles assuming that they continue with constant velocities. A limitation of TTC is that two scenarios that both would not produce a collision under constant velocities cannot be compared using TTC although one scenario may be intrinsically safer than another. A related issue is that TTC is calculated instantaneously and can change dramatically over short time periods. Extensions to TTC have been proposed to mitigate these issues. For example, Time-Exposed TTC (TET) measures to total time the TTC value is positive and smaller than a critical value TTC*, and Time-Integrated TTC (TIT) measures the integral of TTC values over the time when TTC is positive and smaller than TTC*. However, these metrics are still focused on scenarios for which collisions are feasible in the future for constant-velocity scenarios, which is often not the case in steady-state traffic flow on highways.

When anti-lock braking systems (ABS) were first introduced, vehicle collisions temporarily increased in frequency due to legacy vehicles colliding into the rear ends of ABS-equipped vehicles with superior braking performance. This negative, albeit ephemeral, result was not anticipated because control engineers had failed to consider the effect of the following vehicle on safety. Similarly, empirical results have shown that although ACC systems decrease the collision probability of an ACC equipped vehicle with a preceding vehicle, they may increase the collision probability of a follower vehicle with the equipped vehicle. Whereas ABS is simply meant to complement a driver's own decision making, ACC systems are themselves decision-making systems. Consequently, there is an opportunity to develop ACC systems to be sensitive to both the dangers of front-end as well as rear-end collisions. To do so, safety measures have to be developed that quantify the risk of both kinds of collisions.

SUMMARY

Toward this end, the present disclosure provides a novel model-predictive control approach to ACC design that is sensitive to both the preceding vehicle as well as the follower vehicle, where the follower's driving behavior is a disturbance which must be managed by the system to ensure safety, comfort, and high performance. In various embodiments, the invention is a controller that is programmed to control the speed of a vehicle (the "ego" vehicle) based on the characteristics of the preceding ("leader") vehicle and the following ("follower") vehicle, and using novel specific algorithms that extend an existing multi-objective MPC for ACC to consider a three-vehicle case where the controller is sensitive to both the leader vehicle and a follower vehicle.

In some embodiments, the invention relates to methods of ACC in an ego vehicle moving at a speed comprising: sensing a speed of a leader vehicle in front of the ego vehicle and a distance of the leader vehicle from the ego vehicle; sensing a speed of a follower vehicle behind the ego vehicle and a distance of the follower vehicle from the ego vehicle; and controlling the speed of the ego vehicle to avoid collision with the leader vehicle while reducing risk of the ego vehicle being hit by the follower vehicle. In practice, these methods will comprise slowing the speed of the ego vehicle to maintain the distance from the leader vehicle at a safe distance while avoiding risk of the follower vehicle hitting the ego vehicle. Further, the methods will comprise increasing the speed of the ego vehicle to maintain the distance from the follower vehicle at a safe distance while avoiding risk of the ego vehicle hitting the leader vehicle.

The invention further comprises systems for ACC in a vehicle comprising: a sensor adapted to sense a speed of a leader vehicle in front of the vehicle; a sensor adapted to sense a distance from the vehicle to the leader vehicle; a sensor adapted to sense a speed of a follower vehicle behind the vehicle; a sensor adapted to sense a distance from the vehicle to the follower vehicle; a processor; and a controller adapted to control the speed of the ego vehicle to avoid collision with the leader vehicle while reducing risk of the ego vehicle being hit by the follower vehicle.

In another aspect, the invention is a controller for an adaptive cruise control system of a vehicle, the controller including one or more processors and memory in electronic communication with the one or more processors, the memory storing corresponding values for a plurality of constants including a first time gap, a first stopping distance, a second time gap, and a second stopping distance, the memory further storing program instructions that, when executed by the one or more processors, cause the controller to: obtain driving condition data generated at least in part by one or more sensors of the vehicle, the driving condition data representing a velocity of the vehicle, a first distance from the vehicle to a leader vehicle in front of the vehicle, and a second distance from the vehicle to a follower vehicle behind the vehicle; determine, based at least in part on the driving condition data, a first velocity of the leader vehicle and a second velocity of the follower vehicle; determine, based on the second velocity, the second time gap, and the second stopping distance, a threshold safe distance between the vehicle and the follower vehicle; determine a difference between the threshold safe distance and the second distance; determine, based on the difference, whether the second distance to the follower vehicle is less than the threshold safe distance; responsive to a determination that the second distance is less than the threshold safe distance, determine, based on the speed of the vehicle, the first time gap, the first stopping distance, the difference between the threshold safe distance and the second distance, and a safe-spacing policy implemented in the program instructions, a desired distance from the vehicle to the leader vehicle, the controller in conformance with the safe-spacing policy causing the adaptive cruise control system to both avoid collision of the vehicle with the leader vehicle and reduce risk of collision of the vehicle with the follower vehicle; and, control an acceleration of the vehicle to cause the vehicle to move to the desired distance from the leader vehicle.

The program instructions, when executed by the one or more processors, may implement a hybrid model predictive control (MPC) used by the controller, the hybrid MPC including a first MPC disposing the controller in a normal driving mode in which the controller does not use the driving condition data associated with the follower vehicle to determine the desired distance, and a second MPC disposing the controller in a tailgating follower mode in which the controller uses the driving condition data associated with the follower vehicle to determine the desired distance according to the safe-spacing policy, the one or more processors executing the program instructions to cause the controller to: responsive to a determination that the second distance is not less than the threshold safe distance, switch to or remain in the normal driving mode; and, responsive to the determination that the second distance is less than the threshold safe distance, switch to the tailgating follower mode. The memory may further store discretized data of a three-vehicle model, the controller using the hybrid MPC to update the discretized data in continuous-time while the vehicle is operated. The three-vehicle model may include, or be defined by: an input vector to the MPC, the input vector including a measured acceleration of the leader vehicle and a desired acceleration of the vehicle; and a state vector including, as data elements, a first error representing a current disparity between the first distance and the desired distance, a second error representing a current disparity between the first velocity and the velocity, a current acceleration of the vehicle, the velocity of the vehicle, the second distance, and the second velocity.

The program instructions, when executed by the one or more processors, may cause the system to determine, based on the velocity, the second distance, the second velocity, and the second time gap, an expected acceleration of the follower vehicle, and to determine the desired distance further based on the expected acceleration. The memory may further store a corresponding value for a constant gain, the corresponding value for the constant gain selected to produce a relative balance of safety with respect to reducing rear-end collisions with the follower vehicle against following performance of the vehicle with respect to the leader vehicle, and wherein the program instructions, when executed by the one or more processors, further cause the controller to select, as the desired distance, the larger of a reference distance and a modeled distance, wherein the reference distance $d_{ref,le}$ is given by $(\tau_{h,e}v_e + d_{0,e})$ and the modeled distance is given by $(d_{ref,le} - K_f (d_{ef} - d_{des,ef}))$, $d_{des,ef} = (\tau_{h,f} v_f + d_{0,f})$, where $\tau_{h,e}$ is the first time gap, $\tau_{h,f}$ is the second time gap, $v_e$ is the velocity, $v_f$ is the second velocity, $d_{o,e}$ is the first stopping distance, $d_{o,f}$ is the second stopping distance, $K_f$ is the constant gain, and $d_{e,f}$ is the second distance.

In another aspect, the invention is a controller for a vehicle having data collection means including one or more of: a plurality of sensors, a vehicle-to-vehicle communication system, and a vehicle-to-infrastructure communication system. The controller includes one or more processors in electronic communication with the data collection means and memory in electronic communication with the one or more processors and storing program instructions that, when executed by the one or more processors, cause the controller to: obtain, from the data collection means, driving condition data representing at least a velocity of the vehicle, a first distance from the vehicle to a leader vehicle in front of the vehicle, and a second distance from the vehicle to a follower vehicle behind the vehicle; determine, based at least in part on the driving condition data, a first velocity of the leader vehicle and a second velocity of the follower vehicle; determine, based on the velocity of the vehicle, the first velocity of the leader vehicle, the second velocity of the follower vehicle, the second distance to the follower vehicle, and a safe-spacing policy implemented in the program instructions, a desired distance from the vehicle to the leader vehicle, the safe-spacing policy defining an adaptive cruise control that both avoids collision of the vehicle with the leader vehicle and reduces risk of collision of the vehicle with the follower vehicle; determine that the first distance and the desired distance are not equal; and, control the velocity of the vehicle to cause the vehicle to move to the desired distance from the leader vehicle.

To determine the desired distance, the program instructions, when executed by the one or more processors, may cause the controller to: determine, based in part on the second velocity of the follower vehicle, a threshold safe distance between the vehicle and the follower vehicle; determine a difference between the threshold safe distance and the second distance; determine, based on the difference, that the second distance to the follower vehicle is less than the threshold safe distance; and determine the desired distance based in part on the velocity of the vehicle and the difference. The program instructions, when executed by the one or more processors, may further cause the controller to decrease the velocity of the vehicle to cause the vehicle to move to the desired distance from the leader vehicle. The safe spacing policy may specify that, when the follower vehicle is within a threshold safe distance from the vehicle, the threshold safe distance based on the second velocity of the follower vehicle, the desired distance increases as a difference between the second velocity and the threshold safe distance increases. The safe spacing policy may further specify that the desired distance is the greater of: a reference distance calculated from the velocity, a predetermined first time gap desired to elapse between the leader vehicle passing a reference point and the vehicle passing the reference point, and a predetermined first stopping distance to be maintained between the vehicle and the leader vehicle at stop; and, a modeled distance calculated as the reference distance less the difference, wherein the difference is negative and the modeled distance is greater than the reference distance when the follower vehicle is within the threshold safe distance from the vehicle, and the modeled distance is otherwise not greater than the reference distance. The memory may store a constant gain factor having a value selected according to a desired balance between collision risk reduction and vehicle-following performance, both collision risk with respect to the follower vehicle and vehicle-following performance with respect to the leader vehicle decreasing as the value is increased, and wherein the modeled distance is further calculated as the reference distance less the difference multiplied by the value of the constant gain factor.

The program instructions, when executed by the one or more processors, may cause the controller to select and assume one of a plurality of modes including: a normal driving mode in which the controller causes the vehicle to maintain the first distance as a reference distance that is independent of characteristics of the follower vehicle; and, a tailgating follower mode in which the controller uses the driving condition data associated with the follower vehicle to determine the desired distance. The one or more processors may further execute the program instructions to cause the controller to: determine whether the follower vehicle is within a threshold safe distance of the vehicle; responsive to a determination that the follower vehicle is not within the threshold safe distance, switch to or remain in the normal driving mode; and, responsive to a determination that follower vehicle is within the threshold safe distance, switch to or remain in the tailgating follower mode. The program instructions, when executed by the one or more processors, may cause the controller to: determine, based on the velocity, the second distance, the second velocity, and a predetermined time gap desired to elapse between the vehicle passing a reference point and the follower vehicle passing the reference point, an expected acceleration of the follower vehicle; and determine the desired distance further based on the expected acceleration.

In yet another aspect, the invention is a method of adaptive cruise control in an ego vehicle moving at a speed, the method implemented by a computer on the ego vehicle and including the steps of: sensing a speed of a leader vehicle in front of the ego vehicle and a distance of the leader vehicle from the ego vehicle; sensing a speed of a follower vehicle behind the ego vehicle and a distance of the follower vehicle from the ego vehicle; and, based on the distance and the speed of the follower vehicle, controlling the speed of the ego vehicle to avoid collision with the leader vehicle while reducing risk of the ego vehicle being hit by the follower vehicle. Controlling the speed of the ego vehicle may include the steps of: determining that the distance of the follower vehicle has decreased to within a threshold distance; and, slowing the speed of the ego vehicle to increase the distance from the leader vehicle to a safe distance while avoiding risk of the follower vehicle hitting the ego vehicle. Controlling the speed of the ego vehicle may further include the step of determining the safe distance as a reference distance plus an optimal spacing that is proportional to a difference between the distance from the follower vehicle and the threshold distance, the reference distance being a minimum safe distance between the leader vehicle and the ego vehicle. Controlling the speed of the ego vehicle may further include the step of determining the difference and multiplying the difference by a constant gain factor to produce the optimal spacing, the constant gain factor having a value selected according to a desired balance between collision risk reduction and vehicle-following performance, both collision risk and vehicle-following performance decreasing as the value is increased.

The method may further include the steps of: multiplying the speed of the follower vehicle by a desired time gap between the ego vehicle and the follower vehicle to produce an intermediate distance; and, combining a desired stopping distance between the ego vehicle and the follower vehicle with the intermediate distance to produce the threshold distance. Controlling the speed of the ego vehicle may further include the steps of: determining that the distance of the follower vehicle has increased relative to a previous distance of the vehicle from the follower vehicle; and, increasing the speed of the ego vehicle to reduce the distance from the leader vehicle to a safe distance while avoiding risk of the ego vehicle hitting the leader vehicle. Controlling the speed of the ego vehicle may further include the steps of: determining that the distance of the follower vehicle is within a threshold distance; and, determining the safe distance as a reference distance plus an optimal spacing that is proportional to a difference between the distance from the follower vehicle and the threshold distance, the reference distance being a minimum safe distance between the leader vehicle and the ego vehicle.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
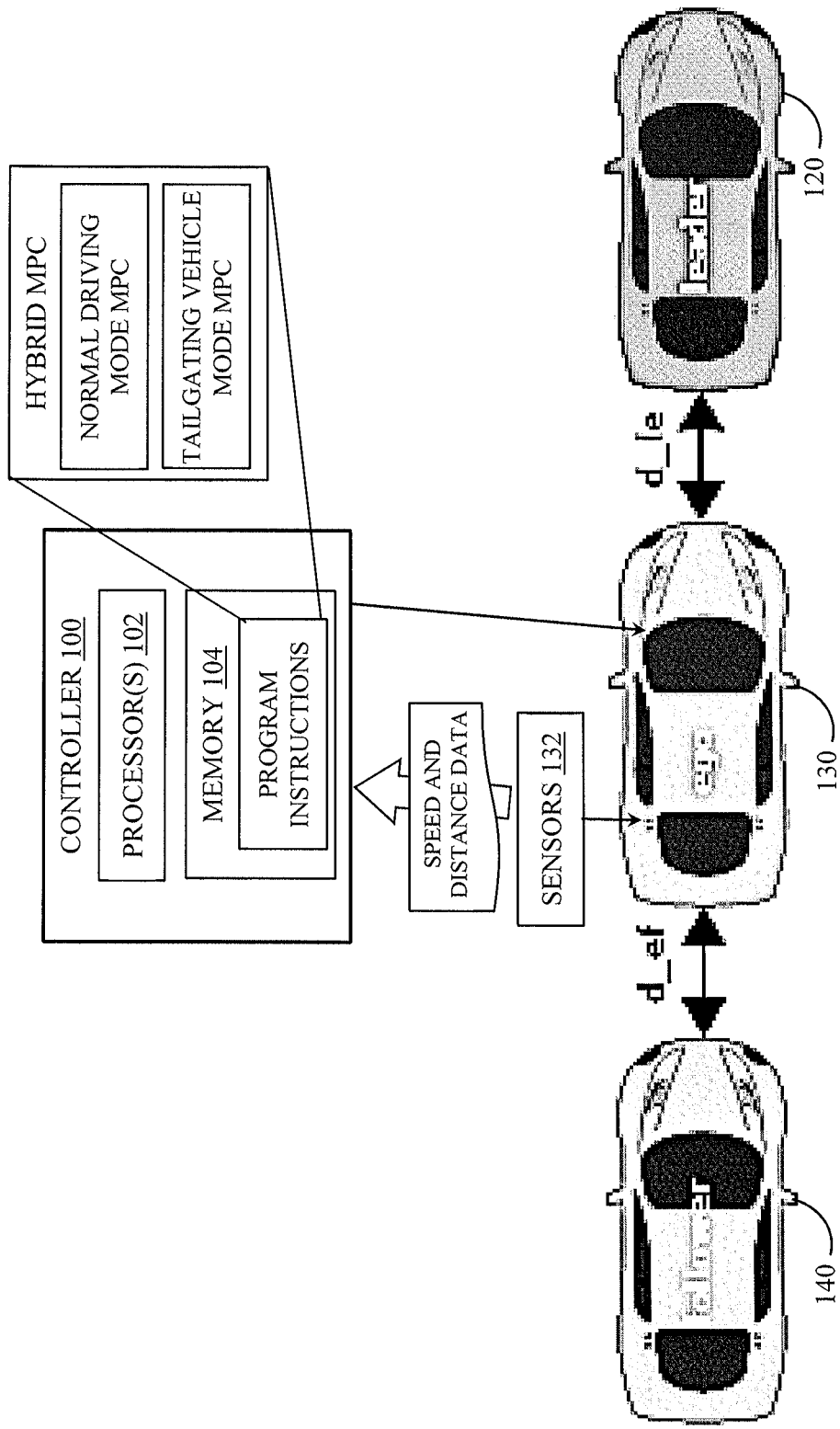
FIG. 1 is a diagram of a three-vehicle scenario in which the ego vehicle has installed thereon, and is controlled by, a controller in accordance with the present disclosure.

The present invention relates to Adaptive Cruise Control (ACC) and methods of collision avoidance with respect to both leader and follower vehicles. The invention includes a controller design that implements a novel safe-spacing model predictive control (MPC) policy based on safety measures that balance safety and performance in a heterogeneous driver environment. Generally, the controller is installed or implemented in an "ego" vehicle; the controller obtains sensor and/or vehicle communication data to monitor the distance and speed of the follower vehicle, and applies the MPC policy to determine a tailgating condition and cause the ego vehicle to gradually slow down and create more space with the preceding vehicle. In turn, the tailgating follower vehicle must slow down to avoid colliding with the ego vehicle, and in case the preceding vehicle does a sudden braking, the ego vehicle will have more space to respond. This will allow the ego vehicle to stop with less braking and reduce the risk of the follower vehicle to "rear-end" the ego vehicle. The algorithms and safety measures provided herein may replace, improve, and/or extend collision avoidance models and policies in the present state of the art.

For example, rather than using collision information to measure safety, surrogate safety measures can be developed for situations that do not necessarily lead to a collision. Several possibilities for such surrogate measures are known in the art. Some approaches augment TTC-based measures with additional metrics; one existing safety prediction model uses TTC, severity of traffic interactions, and probability of those interactions. Similarly, Modified Time-To-Collision (MTTC) has been proposed as an extension to TTC. MTTC itself cannot discriminate based on the severity of a predicted collision, and so a Crash Index (CI) using kinetic energy computations has been proposed to augment MTTC. Prediction models for rear-end collisions have also been proposed, such as the Rear-end Collision Risk Index (RCRI), which uses the concept of kinematic waves to evaluate collision risk over time aggregated freeway traffic data. Another approach is the Deceleration-based Surrogate Safety Measure (DSSM), which assigns a collision risk value that corresponds to the ratio of the required-to-maximum available braking power in case of a sudden braking of a preceding vehicle. The DSSM also incorporates perception and action time for the follower vehicle in the calculations.

Beyond perception and action time, effective policies for increasing driving safety should also predict drivers' intentions and future trajectories. The Intelligent Driver Model (IDM) is one of the most commonly accepted models of realistic driver behavior, modeling single-lane car-following behavior with adjustable parameters for different driver types or different driving conditions. Alternatively, there are simplified car following models for homogeneous highway driving conditions as well as others that rely on a safety margin for car following distance and desired time headway that attempt to capture heuristics commonly believed to be employed by human drivers. Embodiments of the present invention extend a two-vehicle ACC MPC policy framework known as Multi-Objective ACC (MO-ACC) to provide a three-vehicle model that, deployed in a suitably designed controller, avoids collisions that a similarly-configured MO-ACC does not, and further is safer than MO-ACC in terms of a surrogate safety measures meant to evaluate the performance of ACC controllers when there are no imminent collisions.

Controller Design

Embodiments of the present controller may implement a safe-spacing ACC using an extension to the MPC for MO-ACC. The previous system considered a two-vehicle scenario where a vehicle operated by MO-ACC follows behind an independent leader vehicle. Referring to FIG. 1, the present controller 100 is configured to execute the MPC, which comprises computer-implemented algorithms that model a three-vehicle scenario with a leader vehicle 120, an ego vehicle 130 under control of the controller 100, and an additional follower vehicle 140 that follows behind the ego vehicle 130. For example, the controller 100 may include one or more computer processors 102 and memory 104, which may be any suitable computer memory device or other machine-readable data storage device in communication with and accessible by the processor(s) 102; the memory 104 may store values for any of the constants and variables described herein, as well as program instructions executable by the processor(s) 102 to implement any of the ACC tasks described herein. The memory 104 may further store discretized data representing the current state of the three-vehicle model (e.g., current values for the data elements in the state and input vectors described below). The processor(s) 102 and/or memory may be in electronic communication with any relevant data collection means of the ego vehicle 130, such as sensors 132 (e.g., internal sensors such as an accelerometer and/or odometer; external sensors such as infrared cameras that detect distances to nearby objects such as vehicles), V2V communication systems, V2I communication systems, and the like. The MPC, executed by the controller 100, aims to decrease risk of collision of the ego vehicle 130 with respect to both the leader vehicle 120 and the follower vehicle 140.

In some embodiments, the MPC may be configured according to one or more assumptions of the driving conditions in the three-vehicle scenario. For example, the MPC may assume that the follower vehicle 140 is controlled by a human or autonomous driving controller that has its own driving policy which may be aggressive or risky. As a model of the behavior of the follower vehicle 140, the MPC may use the Driver Car Following (DCF) model that was also used to model the reference acceleration in MO-ACC. This assumption enables the MPC to model the plant as a unified model of the three vehicles, i.e., leader 120, ego 130, and follower 140. Acceleration of the leader vehicle 120 may be an input to this model.

The general notation in the following example algorithmic representations of the three-vehicle model applied by the present MPC use l, e, and f as subscripts for leader, ego and follower vehicles, respectively.

TABLE 1

NOTATION USED IN THE THREE-VEHICLE MODEL

| Symbol | Description |
|---|---|
| $d_{le}$ | longitudinal distance between leader and ego |
| $d_{ef}$ | longitudinal distance between ego and follower |
| $v_l, v_e, v_f$ | velocity of (l)eader, (e)go, (f)ollower |
| $a_l, a_e$ | acceleration of (l)eader, (e)go |
| $d_{des,le}$ | desired distance between leader and ego |
| $a_{e,des}$ | desired acceleration of ego |

The state vector of the controlled plant, i.e., the three-vehicle model, is denoted by x and the input vector by u, which are as follows:

$$x = [\Delta d_{le} \ \Delta v_{le} \ a_e \ v_e \ d_{ef} \ v_f]^T \quad (1)$$

$$u = [a_{e,des} \ a_l]^T \quad (2)$$

where:

$$\Delta d_{le} = d_{le} - d_{des,le} \quad (3)$$

$$\Delta v_{le} = v_l - v_e. \quad (4)$$

The difference between the actual distance and the desired distance from the ego vehicle 130 to the leader vehicle 120 may be referred to herein as an "error" that the ego vehicle's 130 systems (e.g., the ACC system) attempts to reduce to zero by controlling the acceleration and/or speed of the ego vehicle 130. The acceleration of the leader vehicle 120, i.e., $a_l$, is modeled as a measured disturbance for the MPC. The proposed MPC generates the control action for the longitudinal motion of the ego vehicle 130 as the desired acceleration signal which is denoted by $\alpha_{e,des}$. The dynamics for the acceleration response of the ego vehicle 130 to the desired acceleration input is given as $$\dot{a}_e = \frac{K_L}{T_L} a_{e,des} - \frac{1}{T_L} a_e \quad (5)$$

with constant gain $K_L$ and time constant $T_L$.

The desired spacing between ego vehicle 130 and follower vehicle 140, noted in FIG. 1 as $d_{des,ef}$, is a variable calculated as described below. This distance acts as a threshold between two discrete dynamical modes of the system. In particular, if a follower vehicle 140 is closer than $d_{des,ef}$, the system switches into a "tailgating vehicle" mode; otherwise, it switches to or maintains a "normal driving" mode. The details of these two modes are discussed further below, while the general system model and the threshold between these two modes are described next.

If there is a follower vehicle 140 behind the ego vehicle 130, possibly tailgating, a sudden braking of the ego vehicle 130, which may be due to a sudden braking of the leader vehicle 120, would cause an increased risk of the follower vehicle 140 rear-ending with the ego vehicle 130. To reduce this collision risk, one approach the ego vehicle 130 can take is to increase its distance with the leader vehicle 120 so that its reaction to a sudden and large deceleration of the leader vehicle 120 can be a smoother and smaller deceleration, which in turn would reduce the collision risk with the follower vehicle 140. That is, the mere existence of a follower vehicle 140 can increase the desired distance between the ego vehicle 130 and the leader vehicle 120 in order to reduce the risk of rear-end collisions. This situation creates an interplay between safety and the vehicle following performance on selecting the optimal spacing between the leader vehicle 120 and the ego vehicle 130. In some embodiments, the present MPC may apply the following spacing policy, which is focused on increasing the safety when necessary while not sacrificing the following performance when there is no increased safety risk.

$$d_{des,le} = \max(d_{re\ f,le}, d_{ref,le} - K_f(d_{ef} - d_{des,ef})) \quad (6)$$

where $$d_{re\ f,le} = \tau_{h,e} v_e + d_{0,e}$$

$$d_{des,ef} = \tau_{h,f} v_f - d_{0,f}.$$

The nonnegative constant gain $K_f$ characterizes the relative importance of safety with respect to reducing rear-end collisions with the follower vehicle 140—increasing $K_f$ means that car-following performance will be sacrificed for the sake of increasing the rear-end-collision safety. The constants $\tau_{h,f}$ and $d_{0,f}$ are the ego vehicle's 130 desired time gap and the desired stopping distance with respect to the follower vehicle 140, respectively. In practice, $\tau_{h,f}$ and $d_{0,f}$ define the safety threshold distance, i.e., $d_{des,ef}$, with the follower vehicle 140.

The outputs of the plant which are used as the measured outputs for the MPC are denoted by y. The continuous-time state-space representation of the hybrid system is:

$$\begin{cases} \dot{x} = Ax + Bu \\ y = Cx \end{cases} \quad (7)$$

where $$A = \begin{cases} A_{nm}, & \text{if } d_{ef} > d_{des,ef} \\ A_{tg}, & \text{otherwise} \end{cases},$$

-continued $$B = \begin{bmatrix} 0 & 0 \\ 0 & 1 \\ K_L/T_L & 0 \\ 0 & 0 \\ 0 & 0 \\ 0 & 0 \end{bmatrix}, \text{ and } C = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

The subscripts nm and tg represent "normal driving mode" and "tailgating follower mode," respectively. The matrices $A_{nm}$ and $A_{tg}$ are defined in the following subsections.

If there is no follower vehicle 140 or the distance between the ego vehicle 130 and the follower vehicle 140 is large, there is no need for the ego vehicle 130 to take the follower vehicle 140 into consideration for computing a desired distance to the leader vehicle 120. In this case, the desired following distance of the ego vehicle 130 is computed as:

$$d_{des,le} = \tau_{h,e} v_e + d_{0,e}.$$

Here, $\tau_{h,e}$ is the ego vehicle's 130 desired car-following time gap constant, and $d_{0,e}$ is the ego vehicle's 130 desired distance with the leader vehicle 120 at stop. Furthermore, the state matrix used for the normal driving behavior is:

$$A_{nm} = \begin{bmatrix} 0 & 1 & -\tau_{h,e} & 0 & 0 & 0 \\ 0 & 0 & -1 & 0 & 0 & 0 \\ 0 & 0 & -1/T_L & 0 & 0 & 0 \\ 0 & 0 & 1 & 0 & 0 & 0 \\ 0 & 0 & 0 & 1 & 0 & -1 \\ 0 & 0 & 0 & k_{V,f} & k_{D,f} & A_{6,v_f} \end{bmatrix}$$

where $$A_{6,v_f} = -k_{V,f} - k_{D,f}\tau_{h,f}.$$

For practical considerations, when there exists no follower vehicle 140, the longitudinal distance between the ego vehicle 130 and the follower ($d_{ef}$) can be taken as infinite and the follower velocity ($v_f$) can be taken as zero. Thus, when in normal driving mode, embodiments of the present MPC may operate in a similar manner to the MPC of a MO-ACC controller.

When the follower vehicle 140 moves within the computed safe distance, i.e., $d_{ef} > d_{des,ef}$ to the ego vehicle 130, the safe spacing policy becomes active. The desired following distance for ego vehicle 130 in tailgating mode simplifies from Eq. (6) to:

$$d_{des,le} = d_{ref,le} - K_f(d_{ef} - d_{des,ef}).$$

Although the MPC controller cannot directly control the follower vehicle 140, the MPC may assume that the controller of the follower vehicle 140, which can be a human driver or an automated driving controller, reacts to the acceleration and deceleration of the ego vehicle 130. In some embodiments, the present MPC may model the reactive behavior of the follower vehicle 140 (i.e., as produced by the follower vehicle's 140 controller) using the DCF model or another suitable driver behavior simulation model. For example, the expected acceleration of the follower vehicle 140 may be modeled as:

$$a_f = k_{D,f}(d_{ef} - \tau_{h,f}v_f) + k_{V,f}(v_e - v_f) \quad (8)$$

where $k_{D,f}$ and $k_{V,f}$ are constant gains.

The state, input, and output matrices used for the tailgating driving behavior are given as:

$$A_{tg} = \begin{bmatrix} 0 & 1 & -\tau_{h,e} & A_{1,v_e} & A_{1,d_{ef}} & A_{1,v_f} \\ 0 & 0 & -1 & 0 & 0 & 0 \\ 0 & 0 & -1/T_L & 0 & 0 & 0 \\ 0 & 0 & 1 & 0 & 0 & 0 \\ 0 & 0 & 0 & 1 & 0 & -1 \\ 0 & 0 & 0 & k_{V,f} & k_{D,f} & A_{6,v_f} \end{bmatrix}$$

where $$A_{1,v_e} = K_f - K_f\tau_{h,f}k_{V,f}$$

$$A_{1,d_{ef}} = -K_f\tau_{h,f}k_{D,f}$$

$$A_{1,v_f} = -K_f + K_f\tau_{h,f}(k_{V,f} + k_{D,f}\tau_{h,f})$$

$$A_{6,v_f} = -k_{V,f} - k_{D,f}\tau_{h,f}.$$

In various embodiments, the plant dynamics may be hybrid as described above. The controller 100 may therefore include a hybrid MPC that, when executed, causes the controller to switch between separate MPCs for each of the two driving modes—normal driving mode and tailgating vehicle mode. For example, the controller switches to the tailgating mode when a follower enters into critical following area, i.e., when $d_{ef} \leq d_{des,ef}$; otherwise, it operates in the normal driving mode. Optimally in this design, the desired following distance, i.e., Eq. (6), does not contain discontinuity at the boundary of the switching conditions.

The continuous-time dynamics for normal driving and tailgating follower modes that are given in Eq. (7) may be discretized for a discrete-time MPC. The first input $\alpha_{e,des}$ to the plant is defined as the manipulated variable for the MPC, and the second input $\alpha_l$ is defined as a measured disturbance which, in practice, is expected to be measured by either sensors or obtained by vehicle-to-vehicle (V2V) communication channels.

In some embodiments, the present MPC may operate according to some or all of the following constraints:

$$\underline{\alpha}_{e,des} - \underline{\alpha}_{e,des}^E \epsilon^2 \leq \alpha_{e,des} \leq \overline{\alpha}_{e,des} + \overline{\alpha}_{e,des}^E \epsilon^2 \quad (9a)$$

$$\underline{\delta\alpha}_{e,des} - \underline{\delta\alpha}_{e,des}^E \epsilon^2 \leq \delta\alpha_{e,des} \leq \overline{\delta}^-\alpha_{e,des} + \overline{\delta}^-\alpha_{e,des}^E \epsilon^2 \quad (9b)$$

$$\underline{\Delta d}_{le} - \underline{\Delta d}_{le}^E \epsilon^2 \leq \Delta d_{le} \leq \Delta^- d_{le} + \Delta^- d_{le}^E \epsilon^2 \quad (9c)$$

$$\underline{\Delta v}_{le} - \underline{\Delta v}_{le}^E \epsilon^2 \leq \Delta v_{le} \leq \Delta \overline{v}_{le} + \Delta^- v_{le}^E \epsilon^2 \quad (9d)$$

$$\underline{\alpha}_e - \underline{\alpha}_e^E \epsilon^2 \leq \alpha_e \leq \overline{\alpha}_e + \overline{\alpha}_e^E \epsilon^2 \quad (9e)$$

$$\underline{v}_e - \underline{v}_e^E \epsilon^2 \leq v_e \leq v_e^{max} \quad (9f)$$

$$-\Delta d_{le} - \tau_{h,e}v_e + \tau_{TTC,e}\Delta v_{le} \leq d_0 \quad (9g)$$

$$-\Delta d_{le} - \tau_{h,e}v_e \leq d_0 - d_{s0} \quad (9h)$$

$$\underline{d}_{ef} - \underline{d}_{ef}^E \epsilon^2 \leq d_{ef} \quad (9i)$$

where $\delta\alpha_{e,des}$ is the rate of the change in the input $\alpha_{e,des}$ and $\tau_{TTC,e}$ is the desired minimum time-to-collision between ego vehicle 130 and the leader vehicle 120. The minimum and maximum values used to put constraints on the states are denoted by and $\underline{\phantom{a}}$ and $\overline{\phantom{a}}$, respectively. The slack variable $\epsilon$ may be used to soften some of the constraints. The non-negative slack variable factors, which are represented by an E in their superscript, define how soft the corresponding constraints are. When a slack variable factor is at its smallest value (i.e., zero), the corresponding constraint becomes a hard constraint.

In some embodiments, the present MPC may use a cost function that seeks to minimize $$J = \sum_{i=1}^{N} (w_{\Delta d_{le}} \Delta d_{le}^2[i] + w_{\Delta v_{le}} \Delta v_{le}^2[i] + \qquad (10)$$

$$w_{a_e}(k_D \Delta d_{le}[i] + k_V \Delta v_{le}[i] - a_e[i])^2) +$$

$$\sum_{i=0}^{N-1} \left( w_{a_{e,des}} a_{e,des}^2 \right) + \sum_{i=0}^{N-1} \left( w_{\delta a_{e,des}} \delta a_{e,des}^2 \right) + \rho \epsilon^2$$

where N denotes the prediction horizon and [i] represents the value of the corresponding variable at the $i^{th}$ step of the horizon. The weight of increasing slack variable $\epsilon$ for satisfying the constraints is given as $\rho$.

EXPERIMENTS

To demonstrate the improved results of the present MPC relative to previous implementations of MO-ACC, experiments were executed by implementing the MO-ACC and the present hybrid MPC with safe spacing policy in MATLAB Model Predictive Control Toolbox™ and carrying out simulations in the SIMULINK® environment. With reference to the Figures and the description below, the implementation of the proposed hybrid MPC with safe spacing policy is identified as SS-ACC. In order to evaluate the performance of the present controller, the performance and the safety measures of the SS-ACC are compared to those of the MO-ACC implementation.

A novel safety measure was developed to evaluate the performance of SS-ACC over MO-ACC for achieving collision reduction. It is a challenging job to describe a safety measure which would evaluate all the possible risks for all possible driving behaviors. The proposed deceleration-based surrogate safety measure (DSSM) for rear-end collision risk considers braking capabilities of the vehicles and continuously computes the risk of a collision in the case of an emergency braking of the preceding vehicle. The DSSM is effectively a measure of the amount of available braking capacity that must be used to avoid a collision when the preceding vehicle brakes with its full capacity. A DSSM value larger than 1 means that, if the preceding vehicle brakes with full capacity, it is impossible to avoid the collision even if the ego vehicle 130 applies brakes at full capacity as well. In the present experiments, the DSSM values for the ego and the follower vehicles 130, 140 are constantly computed; further, the maximum possible braking needed for the ego vehicle 130 is also computed, and is used as the maximum braking capacity of the leader vehicle 120 for the DSSM computations of the follower vehicle 140. This effectively means that as the ego vehicle 130 requires less braking in case of an emergency caused by the leader vehicle 120, the follower vehicle 140 will have less risk of rear-ending with the ego vehicle 130. The experiments focused on the reduction of the collision risks which arise as a result of a full braking of the leader vehicle 120 and not the collision risks arising from a possible full braking of the ego vehicle 130 itself.

Figure 2:
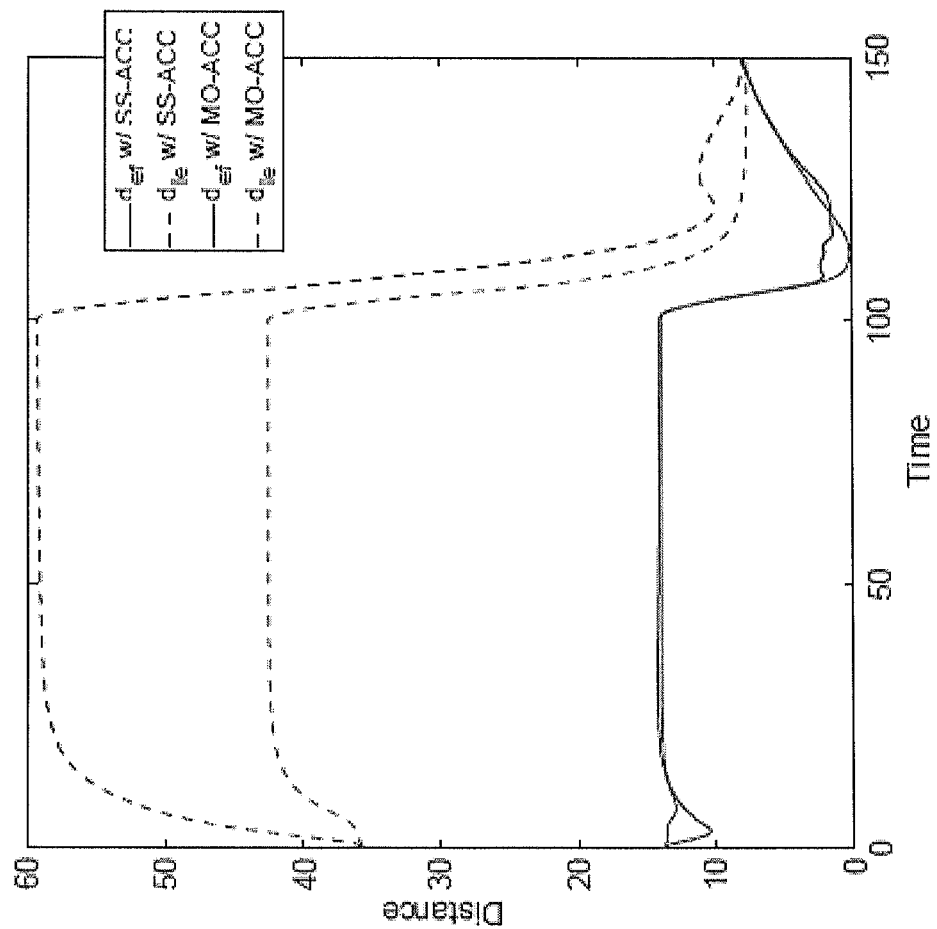
FIG. 2 is a diagram of simulation data comparing collision avoidance results of the present controller against a controller representing the state of the art.

Experiment 1: Emergency Braking of the Leader. In this simulation, the leader vehicle 120 decelerates from 15 m/s to 1 m/s with a deceleration of −2.5 m/s². For the simulations, the follower vehicle 140 behavior uses a proportional control with a target of constant 13 m following distance with the ego vehicle 130. FIG. 2 shows the distance between the leader vehicle 120 and the ego vehicle 130, $d_{le}$, and the distance between the ego vehicle 130 and the follower vehicle 140, $d_{ef}$, for the cases when the ego vehicle 130 is controlled by MO-ACC and by SS-ACC. As it can be observed in the figure, the ego vehicle 130 increases its following distance to the leader as the follower vehicle 140 tailgates. A close look into the distance between the ego vehicle 130 and the follower vehicle 140 ($d_{ef}$) shows that a follower-ego collision after the emergency braking of the leader vehicle 120 at time 100 occurs with MO-ACC and is avoided with SS-ACC.

Figure 3:
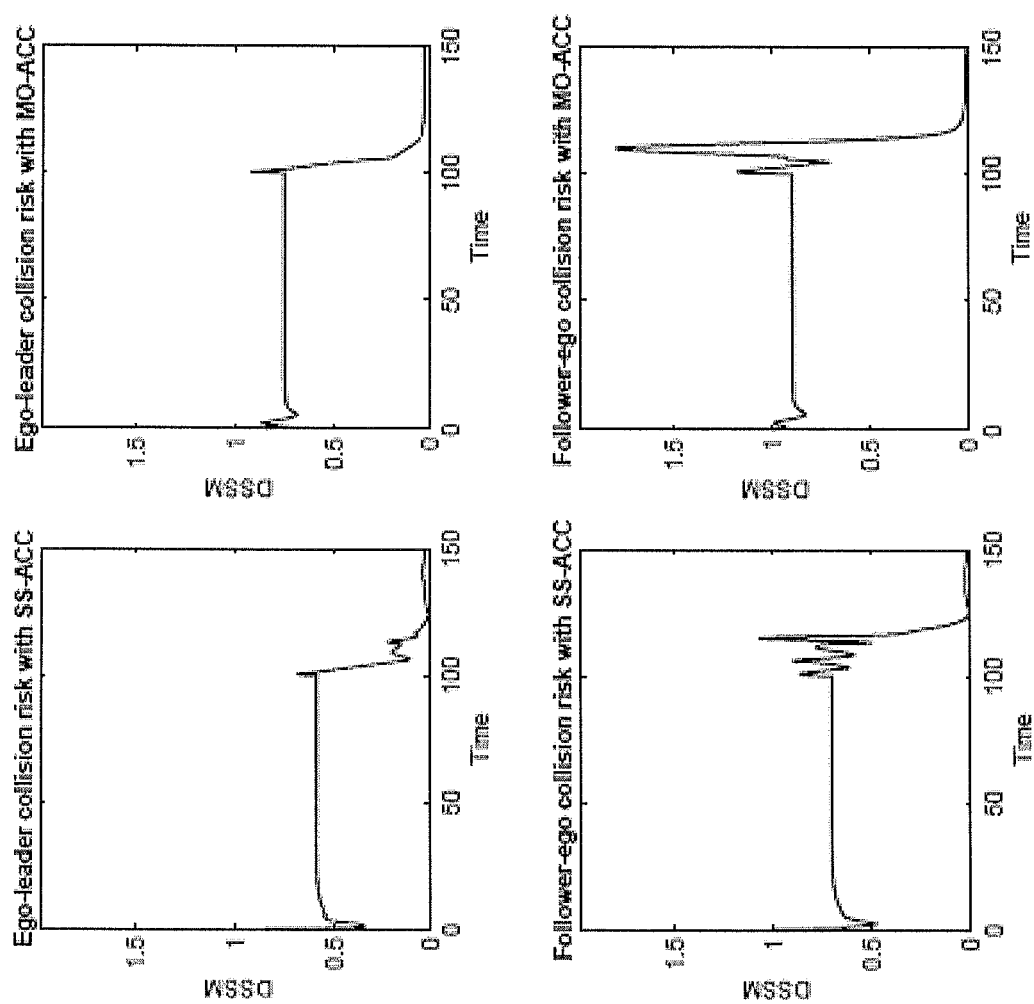
FIG. 3 is a diagram of simulation data comparing collision risk of the ego vehicle with the leader and follower vehicles when controlled by the present controller against the controller representing the state of the art.

FIG. 3 shows the surrogate safety measure, DSSM, values for the ego and the follower vehicle 140 for the emergency-braking leader scenario. Because the ego vehicle 130 is following with a longer distance when controlled by SS-ACC, it has less risk of collision with the leader compared to the case in which it is controlled by MO-ACC. This comes with a cost in reduced following performance. Furthermore, the DSSM value does not exceed the critical level of 1 even with MO-ACC. On the other hand, a comparison of the DSSM values for the follower vehicle 140 shows that controlling the ego vehicle 130 with SS-ACC results in a significant decrease in the collision risk of the follower vehicle 140 into the ego vehicle 130. This shows that SS-ACC adds a new dimension of safety to the existing MO-ACC design.

Figure 4:
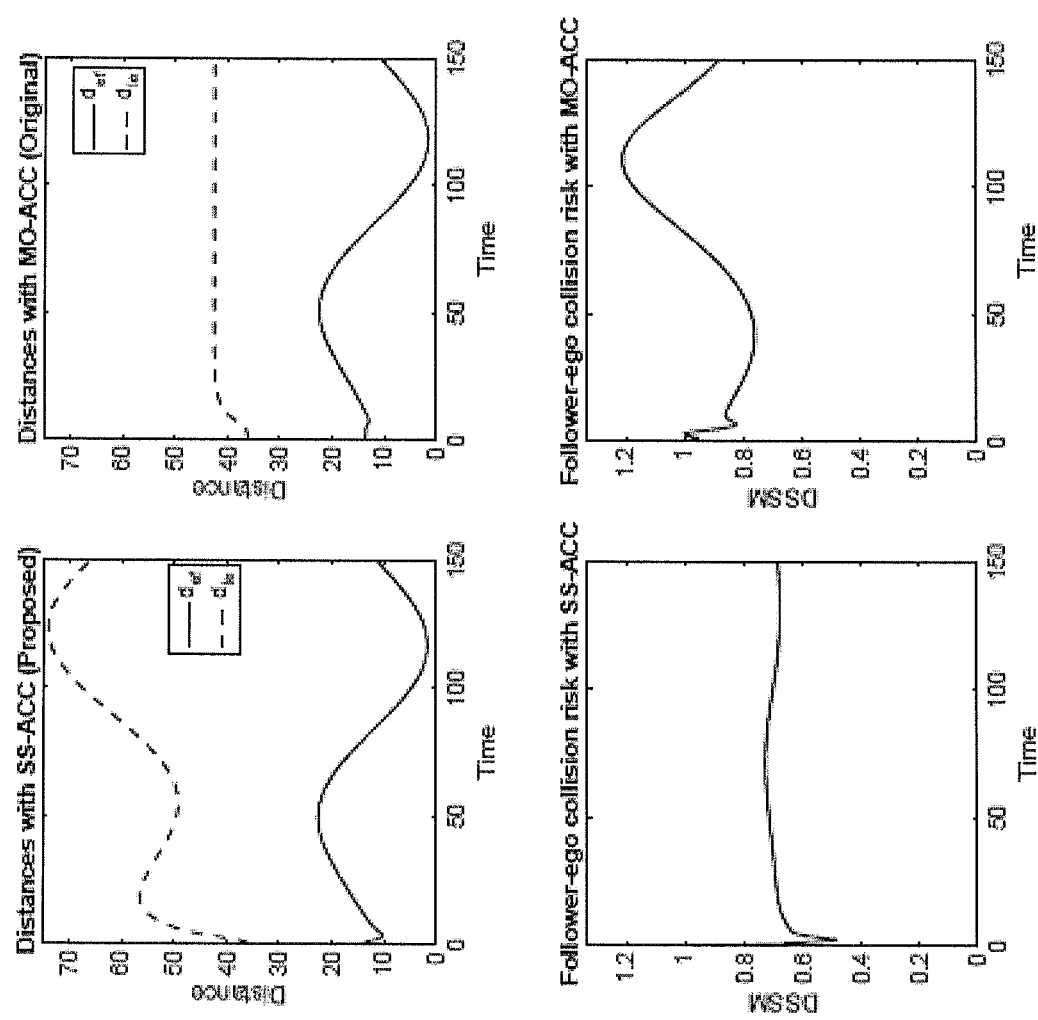
FIG. 4 is a diagram of simulation data comparing following distance of the ego vehicle to the leader vehicle in response to changing distance of the follower vehicle, when controlled by the present controller against the controller representing the state of the art.

Experiment 2: Varying Follower Distance. Again, the collision risk (DSSM) of the follower vehicle 140 with the ego vehicle 130 when the ego vehicle 130 is under the control of SS-ACC was compared to that of MO-ACC. In this simulation, there is no collision and the goal is to investigate how DSSM value is affected from varying follower vehicle 140 following distance and how SS-ACC is able to reduce the collision risk (DSSM value). The follower vehicle 140 is modeled to have a spacing with the ego vehicle 130 that changes sinusoidally over the simulation time between approximately 2 m and 22 m. The top part of FIG. 4 shows the effect that changing the simulated follower-ego distance ($d_{ef}$) has on the ego-leader distance ($d_{le}$) managed by the controller. The bottom part of FIG. 4 shows the DSSM values of the follower vehicle 140 for the SS-ACC controlled ego vehicle 130 and MO-ACC controlled ego vehicle 130 cases. As it can be seen in the figure, by controlling the ego vehicle 130 with SS-ACC, it is possible to reduce the collision risk with the follower vehicle 140 even if the distance between ego 130 and follower 140 becomes shorter. This is the outcome of the fact that, while the MO-ACC controller does not react to the decreasing ego-follower distance, the SS-ACC controller causes the ego vehicle 130 to increase its own following distance with respect to the leader vehicle 120, and needs a smaller braking power in the worst case to avoid collision.

Figure 5:
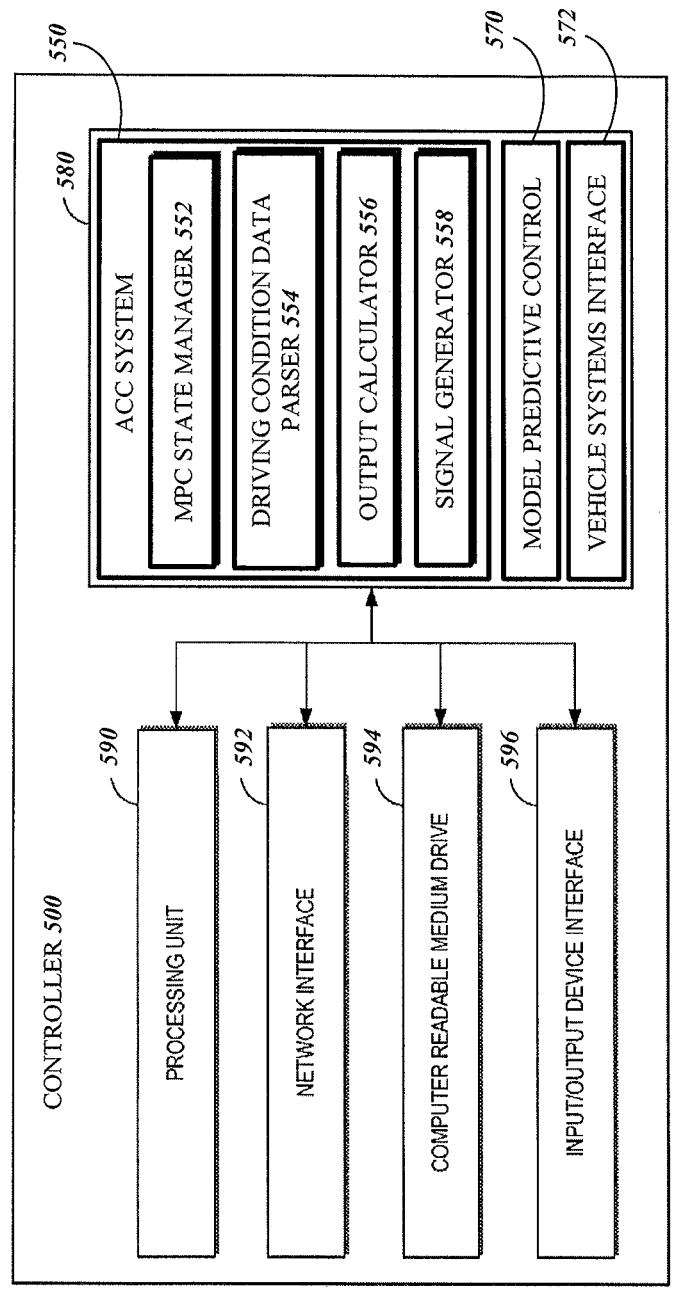
FIG. 5 is a diagram of an example computing device implementing an example controller in accordance with the present disclosure.

FIG. 5 depicts a general architecture of a computing system (referenced as controller 500) that performs adaptive cruise control of a vehicle as described above. The general architecture of the controller 500 includes an arrangement of computer hardware and software modules that may be used to implement aspects of the present disclosure. The hardware modules may be implemented with physical electronic devices, as discussed in greater detail below. The controller 500 may include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in the preceding Figures, including the resource allocation system, the security assessment system, and the network-accessible services system, each of which may be implemented in the same or a separate architecture from the others.

As illustrated, the controller 500 includes a processing unit (processor) 590, a network (i.e., communication) interface 592, a computer readable medium drive 594, an input/output device interface 596, all of which may communicate with one another by way of a communication bus. The network interface 592 may provide connectivity to one or more networks or computing systems. The processor 590 may thus receive information and instructions from other computing systems or services via a communication network. The processor 590 may also communicate to and from memory 580 and further provide output information for an optional display (not shown) via the input/output device interface 596. The input/output device interface 596 may also accept input from an optional input device (not shown).

The memory 580 may contain computer program instructions (grouped as modules in some embodiments) that the processor 590 executes in order to implement one or more aspects of the present disclosure. The memory 580 generally includes RAM, ROM and/or other persistent, auxiliary or non-transitory computer-readable media. The memory 580 may include computer program instructions and other information for implementing aspects of the present disclosure. For example, in one embodiment, the memory 580 implements an adaptive cruise control system 550, an MPC 570, and one or more vehicle systems interfaces 572, as described above. In addition, the memory 580 may include and/or provide executable instructions or reference data that enable the processor 590 to communicate with one or more data repositories (not shown), for example, to access sensor data, vehicle state data, stored models, and the like.

The ACC system 550 may include several services implemented in hardware, software, or a combination thereof, and communicating with various other systems and services and with physical (e.g., hard drives) or virtual resources (e.g. logical drives) to obtain and analyze data for controlling the speed of the vehicle according to the processes described herein. In some embodiments, a different service 552-558 may analyze, transform, and/or produce different types of data needed to generate a continuous-time feedback loop and update and control the speed of the vehicle, although in other embodiments services may be consolidated, or unused if the corresponding type of data is not collected or analyzed. For example, some or all of the services 552-558 may be "chained" together, in that a first service 552 analyzes data to produce a first result that is delivered to a second service 554, which analyzes the first result as the service's 554 input data (alone or with other data) and produces a second result, and a third service 556 uses the second result (and possibly other data) as its input data to produce a third result. Any of the services 552-558 may use other data stored in memory 580, and/or may cause other systems or components of the vehicle to use such data. For example, a service of the ACC system 550 may use a vehicle system interface 572 to communicate with data collection systems/devices, such as sensors, communication systems, or a central processor of the vehicle, to obtain driving condition data collected by the sensors.

In various examples, the policy analyzer service 550 may include an MPC state manager 552 that uses the algorithms of the MPC 570 to monitor, obtain, and/or update the values in the state vector of the plant. A driving condition data parser 554 may obtain raw or processed sensor data or other collected data representing driving conditions such as the vehicle speed, distances to leader and/or follower vehicles, acceleration of the leader vehicle, etc. Additionally, the parser 554 may compute driving condition data elements from the collected data; for example, the parser 554 may compute the follower vehicle's speed based on the vehicle's speed, the distance to the follower vehicle, and previous values for those properties. An output calculator 556 may determine the values to be output to other vehicle systems to control the acceleration and/or speed of the vehicle (e.g., the desired acceleration, as an output of the MPC). A signal generator 558 may convert the determined output(s) into signals that the recipient systems are able to process.

All of the devices, systems, methods, configurations, and compositions disclosed and claimed herein can be made and executed without undue experimentation in light of the present disclosure. While the compositions and methods of this invention have been described in terms of preferred embodiments, it will be apparent to those of skill in the art that variations may be applied to the devices, systems, method, and compositions and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A controller for an adaptive cruise control system of a vehicle, the controller comprising one or more processors and memory in electronic communication with the one or more processors, the memory storing corresponding values for a plurality of constants including a first time gap, a first stopping distance, a second time gap, and a second stopping distance, the memory further storing program instructions that, when executed by the one or more processors, cause the controller to:

obtain driving condition data generated at least in part by one or more sensors of the vehicle, the driving condition data representing a velocity of the vehicle, a first distance from the vehicle to a leader vehicle in front of the vehicle, and a second distance from the vehicle to a follower vehicle behind the vehicle;

determine, based at least in part on the driving condition data, a first velocity of the leader vehicle and a second velocity of the follower vehicle;

determine, based on the second velocity, the second time gap, and the second stopping distance, a threshold safe distance between the vehicle and the follower vehicle;

determine a difference between the threshold safe distance and the second distance;

determine, based on the difference, whether the second distance to the follower vehicle is less than the threshold safe distance;

responsive to a determination that the second distance is less than the threshold safe distance, determine, based on the speed of the vehicle, the first time gap, the first stopping distance, the difference between the threshold safe distance and the second distance, and a safe-spacing policy implemented in the program instructions, a desired distance from the vehicle to the leader vehicle, the controller in conformance with the safe-spacing policy causing the adaptive cruise control system to both avoid collision of the vehicle with the leader vehicle and reduce risk of collision of the vehicle with the follower vehicle; and control an acceleration of the vehicle to cause the vehicle to move to the desired distance from the leader vehicle, wherein the program instructions, when executed by the one or more processors, implement a hybrid model predictive control (MPC) used by the controller, the hybrid MPC comprising:

a first MPC disposing the controller in a normal driving mode in which the controller does not use the driving condition data associated with the follower vehicle to determine the desired distance; and a second MPC disposing the controller in a tailgating follower mode in which the controller uses the driving condition data associated with the follower vehicle to determine the desired distance according to the safe-spacing policy and slow the velocity of the vehicle, the one or more processors executing the program instructions to cause the controller to:

responsive to a determination that the second distance is not less than the threshold safe distance, switch to or remain in the normal driving mode; and responsive to the determination that the second distance is less than the threshold safe distance, switch to the tailgating follower mode.

2. The controller of claim 1, wherein the memory further stores discretized data of a three-vehicle model, the controller using the hybrid MPC to update the discretized data in continuous-time while the vehicle is operated, the three-vehicle model comprising:

an input vector to the MPC, the input vector including a measured acceleration of the leader vehicle and a desired acceleration of the vehicle; and a state vector including, as data elements, a first error representing a current disparity between the first distance and the desired distance, a second error representing a current disparity between the first velocity and the velocity, a current acceleration of the vehicle, the velocity of the vehicle, the second distance, and the second velocity.

3. The controller of claim 1, wherein the program instructions, when executed by the one or more processors, cause the system to:

determine, based on the velocity, the second distance, the second velocity, and the second time gap, an expected acceleration of the follower vehicle; and determine the desired distance further based on the expected acceleration.

4. The controller of claim 1, wherein the memory further stores a corresponding value for a constant gain, the corresponding value for the constant gain selected to produce a relative balance of safety with respect to reducing rear-end collisions with the follower vehicle against following performance of the vehicle with respect to the leader vehicle, and wherein the program instructions, when executed by the one or more processors, further cause the controller to select, as the desired distance, the larger of a reference distance and a modeled distance, wherein:

the reference distance $d_{re\_ff,ie}$ is given by $(\tau_{h,e}v_e+d_{0,e})$, and the modeled distance is given by $(d_{re\_f,ie}-K_f(d_{e\_f}-d_{des,e\_f}))$, $d_{des,e\_f}=(\tau_{h,f}v_f+d_{0,f})$, where $\tau_{h,e}$ is the first time gap, $\tau_{h,f}$ is the second time gap, $v_e$ is the velocity, $v_f$ is the second velocity, $d_{0,e}$ is the first stopping distance, $d_{0,f}$ is the second stopping distance, $K_f$ is the constant gain, and $d_{e\_f}$ is the second distance.

5. The controller of claim 1, wherein the hybrid MPC comprises a continuous-time state-space representation, the tailgating follower mode represented by state matrix:

$$A_{tg} = \begin{bmatrix} 0 & 1 & -\tau_{h,e} & A_{1,v_e} & A_{1,d_{ef}} & A_{1,v_f} \\ 0 & 0 & -1 & 0 & 0 & 0 \\ 0 & 0 & -1/T_L & 0 & 0 & 0 \\ 0 & 0 & 1 & 0 & 0 & 0 \\ 0 & 0 & 0 & 1 & 0 & -1 \\ 0 & 0 & 0 & k_{V,f} & k_{D,f} & A_{6,v_f} \end{bmatrix} \text{ where}$$

$$A_{1,v_e} = -K_f - K_f\tau_{h,f}k_{V,f}$$
$$A_{1,d_{e,f}} = K_f\tau_{h,f}k_{D,f}$$
$$A_{1,v_f} = -K_f + K_f\tau_{h,f}(k_{V,f} + k_{D,f}\tau_{h,f})$$
$$A_{6,v_f} = -k_{V,f} - k_{D,f}\tau_{h,f},$$

and $T_L$ is a time constant, $\tau_{h,f}$ is the second time gap, and $K_f, k_{D,f}$, and $k_{V,f}$ are gain constants.

6. A controller for a vehicle having data collection means including one or more of:

a plurality of sensors, a vehicle-to-vehicle communication system, and a vehicle-to-infrastructure communication system, the controller comprising one or more processors in electronic communication with the data collection means and memory in electronic communication with the one or more processors and storing program instructions that, when executed by the one or more processors, cause the controller to:

obtain, from the data collection means, driving condition data representing at least a velocity of the vehicle, a first distance from the vehicle to a leader vehicle in front of the vehicle, and a second distance from the vehicle to a follower vehicle behind the vehicle;

determine, based at least in part on the driving condition data, a first velocity of the leader vehicle and a second velocity of the follower vehicle;

determine, based on the velocity of the vehicle, the first velocity of the leader vehicle, the second velocity of the follower vehicle, the second distance to the follower vehicle, and a safe-spacing policy implemented in the program instructions, a desired distance from the vehicle to the leader vehicle, the safe-spacing policy defining an adaptive cruise control that both avoids collision of the vehicle with the leader vehicle and reduces risk of collision of the vehicle with the follower vehicle;

determine that the first distance and the desired distance are not equal;

control the velocity of the vehicle to cause the vehicle to move to the desired distance from the leader vehicle; and select and assume one of a plurality of modes including a normal driving mode, in which the controller causes the vehicle to maintain the first distance as a reference distance that is independent of characteristics of the follower vehicle, and a tailgating follower mode, in which the controller uses the driving condition data associated with the follower vehicle to slow the velocity of the vehicle to increase the first distance from the vehicle to the leader vehicle, wherein to select and assume one of the plurality of modes, execution of the program instructions further causes the controller to:
determine whether the follower vehicle is within a threshold safe distance of the vehicle;
responsive to a determination that the follower vehicle is not within the threshold safe distance, switch to or remain in the normal driving mode; and
responsive to a determination that follower vehicle is within the threshold safe distance, switch to or remain the tailgating follower mode.

7. The controller of claim 6, wherein to determine the desired distance, the program instructions, when executed by the one or more processors, cause the controller to:
determine, based in part on the second velocity of the follower vehicle, the threshold safe distance between the vehicle and the follower vehicle;
determine a difference between the threshold safe distance and the second distance;
determine, based on the difference, that the second distance to the follower vehicle is less than the threshold safe distance; and
determine the desired distance based in part on the velocity of the vehicle and the difference.

8. The controller of claim 7, wherein the program instructions, when executed by the one or more processors, cause the controller to decrease the velocity of the vehicle to cause the vehicle to move to the desired distance from the leader vehicle.

9. The controller of claim 6, wherein the safe spacing policy specifies that, when the follower vehicle is within the threshold safe distance from the vehicle, the threshold safe distance based on the second velocity of the follower vehicle, the desired distance increases as a difference between the second velocity and the threshold safe distance increases.

10. The controller of claim 9, wherein the safe spacing policy further specifies that the desired distance is the greater of:
a reference distance calculated from the velocity, a predetermined first time gap desired to elapse between the leader vehicle passing a reference point and the vehicle passing the reference point, and a predetermined first stopping distance to be maintained between the vehicle and the leader vehicle at stop; and
a modeled distance calculated as the reference distance less the difference, wherein the difference is negative and the modeled distance is greater than the reference distance when the follower vehicle is within the threshold safe distance from the vehicle, and the modeled distance is otherwise not greater than the reference distance.

11. The controller of claim 10, wherein the memory stores a constant gain factor having a value selected according to a desired balance between collision risk reduction and vehicle-following performance, both collision risk with respect to the follower vehicle and vehicle-following performance with respect to the leader vehicle decreasing as the value is increased, and wherein the modeled distance is further calculated as the reference distance less the difference multiplied by the value of the constant gain factor.

12. The controller of claim 6, wherein the program instructions, when executed by the one or more processors, cause the controller to:
determine, based on the velocity, the second distance, the second velocity, and a predetermined time gap desired to elapse between the vehicle passing a reference point and the follower vehicle passing the reference point, an expected acceleration of the follower vehicle; and
determine the desired distance further based on the expected acceleration.

13. The controller of claim 6, wherein the controller implements a continuous-time state-space representation comprising a state matrix for the tailgating follower mode, the state matrix being represented as $$A_{tg} = \begin{bmatrix} 0 & 1 & -\tau_{h,e} & A_{1,v_e} & A_{1,d_{ef}} & A_{1,v_f} \\ 0 & 0 & -1 & 0 & 0 & 0 \\ 0 & 0 & -1/T_L & 0 & 0 & 0 \\ 0 & 0 & 1 & 0 & 0 & 0 \\ 0 & 0 & 0 & 1 & 0 & -1 \\ 0 & 0 & 0 & k_{V,f} & k_{D,f} & A_{6,v_f} \end{bmatrix} \text{ where}$$

$$A_{1,v_e} = K_f - K_f \tau_{h,f} k_{V,f}$$
$$A_{1,d_{e,f}} = -K_f \tau_{h,f} k_{D,f}$$
$$A_{1,v_f} = -K_f + K_f \tau_{h,f} (k_{V,f} + k_{D,f} \tau_{h,f})$$
$$A_{6,v_f} = -k_{V,f} - k_{D,f} \tau_{h,f},$$

and $T_L$ is a time constant, $\tau_{h,f}$ is the second time gap, and $K_f, k_{D,f}$, and $k_{V,f}$ are gain constants.

14. A method of adaptive cruise control in an ego vehicle moving at a speed, the method implemented by a computer on the ego vehicle and comprising:
sensing a speed of a leader vehicle in front of the ego vehicle and a distance of the leader vehicle from the ego vehicle;
sensing a speed of a follower vehicle behind the ego vehicle and a distance of the follower vehicle from the ego vehicle; and
based on the distance and the speed of the follower vehicle, controlling the speed of the ego vehicle to avoid collision with the leader vehicle while reducing risk of the ego vehicle being hit by the follower vehicle, the controlling the speed of the ego vehicle comprising:
determining that the distance of the follower vehicle has decreased to within a threshold distance; and
responsive to determining that the distance of the follower vehicle has decreased to within the threshold distance, slowing the speed of the ego vehicle to increase the distance from the leader vehicle to a safe distance while avoiding risk of the follower vehicle hitting the ego vehicle.

15. The method of claim 14, wherein controlling the speed of the ego vehicle further comprises determining the safe distance as a reference distance plus an optimal spacing that is proportional to a difference between the distance from the follower vehicle and the threshold distance, the reference distance being a minimum safe distance between the leader vehicle and the ego vehicle.

16. The method of claim 15, wherein controlling the speed of the ego vehicle further comprises determining the difference and multiplying the difference by a constant gain factor to produce the optimal spacing, the constant gain factor having a value selected according to a desired balance between collision risk reduction and vehicle-following performance, both collision risk and vehicle-following performance decreasing as the value is increased.

17. The method of claim 14, further comprising:
multiplying the speed of the follower vehicle by a desired time gap between the ego vehicle and the follower vehicle to produce an intermediate distance; and
combining a desired stopping distance between the ego vehicle and the follower vehicle with the intermediate distance to produce the threshold distance.

18. The method of claim 14, wherein controlling the speed of the ego vehicle comprises:
determining that the distance of the follower vehicle has increased relative to a previous distance of the vehicle from the follower vehicle; and
increasing the speed of the ego vehicle to reduce the distance from the leader vehicle to a safe distance while avoiding risk of the ego vehicle hitting the leader vehicle.

19. The method of claim 18, wherein controlling the speed of the ego vehicle further comprises:
determining that the distance of the follower vehicle is within a threshold distance; and
determining the safe distance as a reference distance plus an optimal spacing that is proportional to a difference between the distance from the follower vehicle and the threshold distance, the reference distance being a minimum safe distance between the leader vehicle and the ego vehicle.

20. The method of claim 14, wherein controlling the speed of the ego vehicle further comprises calculating a state vector based on a state matrix for the tailgating follower mode, the state matrix being represented as $$A_{tg} = \begin{bmatrix} 0 & 1 & -\tau_{h,e} & A_{1,v_e} & A_{1,d_{ef}} & A_{1,v_f} \\ 0 & 0 & -1 & 0 & 0 & 0 \\ 0 & 0 & -1/T_L & 0 & 0 & 0 \\ 0 & 0 & 1 & 0 & 0 & 0 \\ 0 & 0 & 0 & 1 & 0 & -1 \\ 0 & 0 & 0 & k_{V,f} & k_{D,f} & A_{6,v_f} \end{bmatrix} \text{ where}$$

$$A_{1,v_e} = K_f - K_f \tau_{h,f} k_{V,f}$$
$$A_{1,d_{e,f}} = -K_f \tau_{h,f} k_{D,f}$$
$$A_{1,v_f} = -K_f + K_f \tau_{h,f}(k_{V,f} + k_{D,f}\tau_{h,f})$$
$$A_{6,v_f} = -k_{V,f} - k_{D,f}\tau_{h,f},$$

and $T_L$ is a time constant, $\tau_{h,f}$ is the second time gap, and $K_f, k_{D,f}$, and $k_{V,f}$ are gain constants.

* * * * *

UNITED STATES PATENT AND TRADEMARK OFFICE
CERTIFICATE OF CORRECTION

| | |
|---|---|
| PATENT NO. | : 10,766,489 B2 |
| APPLICATION NO. | : 16/122770 |
| DATED | : September 8, 2020 |
| INVENTOR(S) | : Cumhur Erkan Tuncali et al. |

It is certified that error appears in the above-identified patent and that said Letters Patent is hereby corrected as shown below:

In the Specification

Column 9, TABLE 1, Line 37, "$a_l$, $a_e$" should be --$\alpha_l \alpha_e$--.

Column 9, TABLE 1, Line 39, "$a_{e,des}$" should be --$\alpha_{e,des}$--.

Column 9, Line 61, "$a_l$" should be --$\alpha_l$--.

Signed and Sealed this
Twenty-sixth Day of July, 2022

Katherine Kelly Vidal
*Director of the United States Patent and Trademark Office*